US010341731B2

(12) United States Patent
Elmieh et al.

(10) Patent No.: US 10,341,731 B2
(45) Date of Patent: Jul. 2, 2019

(54) VIEW-SELECTION FEEDBACK FOR A VISUAL EXPERIENCE

(71) Applicant: Google Inc., Mountain View, CA (US)

(72) Inventors: Baback Elmieh, Palo Alto, CA (US); Jan J. Pinkava, Portland, OR (US); Douglas Paul Sweetland, Los Angeles, CA (US); Brian M. Collins, South San Francisco, CA (US); Darren Mark Austin, San Jose, CA (US)

(73) Assignee: Google LLC, Mountain View, CA (US)

( * ) Notice: Subject to any disclaimer, the term of this patent is extended or adjusted under 35 U.S.C. 154(b) by 402 days.

(21) Appl. No.: 14/526,311

(22) Filed: Oct. 28, 2014

(65) Prior Publication Data

US 2016/0054863 A1   Feb. 25, 2016

Related U.S. Application Data

(60) Provisional application No. 62/040,337, filed on Aug. 21, 2014.

(51) Int. Cl.
*G06F 3/0481* (2013.01)
*H04N 21/472* (2011.01)
(Continued)

(52) U.S. Cl.
CPC ..... *H04N 21/47217* (2013.01); *G06F 3/0346* (2013.01); *G06F 3/0484* (2013.01);
(Continued)

(58) Field of Classification Search
CPC .... G06F 3/0346; G06F 3/0482; G06F 3/0484; G06F 3/167; G06F 17/30056;
(Continued)

(56) References Cited

U.S. PATENT DOCUMENTS

| 5,607,356 A | 3/1997 | Schwartz |
| 5,892,507 A | 4/1999 | Moorby et al. |

(Continued)

FOREIGN PATENT DOCUMENTS

| EP | 1087618 | 3/2001 |
| EP | 2209306 | 7/2010 |
| WO | WO-2006056311 | 6/2006 |

OTHER PUBLICATIONS

"Non-Final Office Action", U.S. Appl. No. 14/333,387, dated Jul. 28, 2016, 18 pages.

(Continued)

*Primary Examiner* — Steven P Sax
(74) *Attorney, Agent, or Firm* — Colby Nipper PLLC

(57) ABSTRACT

Techniques and apparatuses for view-selection feedback for a visual experience are described. These techniques and apparatuses enable writers, directors, and other story creators to create or alter visual experiences based on feedback provided by view selections made during visual experiences. This feedback can be analyzed to determine portions of a visual experience that users focused on, wanted to see more of, were not interested in, found difficult to understand, and so forth. With this feedback, visual experiences, such as live-action movies and animated shorts, can be created or improved.

20 Claims, 12 Drawing Sheets

(51) Int. Cl.
*G06F 3/0484* (2013.01)
*G06F 3/0346* (2013.01)
*H04N 21/442* (2011.01)
*H04N 21/25* (2011.01)
*H04N 21/4147* (2011.01)
*H04N 21/438* (2011.01)

(52) U.S. Cl.
CPC ....... *G06F 3/04812* (2013.01); *H04N 21/251* (2013.01); *H04N 21/4147* (2013.01); *H04N 21/4383* (2013.01); *H04N 21/44222* (2013.01)

(58) Field of Classification Search
CPC ........ H04N 21/25; H04N 21/41; H04N 21/43; H04N 21/44; H04N 21/47
See application file for complete search history.

(56) References Cited

U.S. PATENT DOCUMENTS

| | | | |
|---|---|---|---|
| 6,621,504 B1* | 9/2003 | Nadas | G11B 27/034 715/723 |
| 6,714,909 B1 | 3/2004 | Gibbon et al. | |
| 7,467,218 B2 | 12/2008 | Gould et al. | |
| 7,860,309 B1 | 12/2010 | Bodnar et al. | |
| 7,904,812 B2 | 3/2011 | Atlas et al. | |
| 9,086,724 B2 | 7/2015 | Sakaguchi et al. | |
| 9,087,403 B2 | 7/2015 | Keating et al. | |
| 9,183,560 B2* | 11/2015 | Abelow | G06Q 10/067 |
| 9,589,597 B2 | 3/2017 | Austin et al. | |
| 9,607,424 B2 | 3/2017 | Ng et al. | |
| 9,766,786 B2 | 9/2017 | Elmieh et al. | |
| 9,779,480 B2 | 10/2017 | Austin et al. | |
| 9,851,868 B2 | 12/2017 | Elmieh | |
| 10,056,114 B2 | 8/2018 | Austin et al. | |
| 2003/0145331 A1 | 7/2003 | Escobar et al. | |
| 2003/0232318 A1 | 12/2003 | Altenhofen et al. | |
| 2004/0021668 A1 | 2/2004 | Chevallier et al. | |
| 2004/0218911 A1* | 11/2004 | Grimes | H04N 5/907 386/216 |
| 2005/0025465 A1* | 2/2005 | Danieli | H04N 5/9201 386/243 |
| 2006/0256133 A1 | 11/2006 | Rosenberg | |
| 2007/0028270 A1 | 2/2007 | Ostojic et al. | |
| 2007/0061862 A1 | 3/2007 | Berger et al. | |
| 2008/0005669 A1* | 1/2008 | Eilertsen | G11B 27/034 715/210 |
| 2008/0034321 A1* | 2/2008 | Griffin | G06F 1/1626 715/799 |
| 2008/0215172 A1 | 9/2008 | Digon | |
| 2009/0113278 A1* | 4/2009 | Denoue | G06F 3/017 715/201 |
| 2009/0198719 A1* | 8/2009 | DeWitt | G11B 27/034 |
| 2009/0199090 A1* | 8/2009 | Poston | G06F 17/30997 715/255 |
| 2009/0201313 A1 | 8/2009 | Thorn | |
| 2009/0249404 A1 | 10/2009 | Chen | |
| 2010/0115455 A1* | 5/2010 | Kim | G06F 3/04815 715/781 |
| 2010/0153520 A1* | 6/2010 | Daun | G11B 27/034 709/218 |
| 2010/0174421 A1 | 7/2010 | Tsai et al. | |
| 2010/0208138 A1 | 8/2010 | Mohri et al. | |
| 2010/0251101 A1 | 9/2010 | Haussecker et al. | |
| 2011/0126106 A1 | 5/2011 | Ben et al. | |
| 2011/0265113 A1* | 10/2011 | Apfel | H04N 7/025 725/32 |
| 2011/0299832 A1 | 12/2011 | Butcher | |
| 2011/0304627 A1 | 12/2011 | Kegel | |
| 2012/0092348 A1 | 4/2012 | McCutchen | |
| 2012/0249424 A1 | 10/2012 | Bove et al. | |
| 2013/0073473 A1* | 3/2013 | Heath | G06Q 30/02 705/319 |
| 2014/0002580 A1 | 1/2014 | Bear et al. | |
| 2014/0133834 A1* | 5/2014 | Shannon | H04N 9/80 386/278 |
| 2014/0282013 A1 | 9/2014 | Amijee | |
| 2015/0012827 A1 | 1/2015 | Elmeih | |
| 2015/0022557 A1 | 1/2015 | Austin et al. | |
| 2015/0023650 A1* | 1/2015 | Austin | H04N 21/4314 386/241 |
| 2015/0026576 A1 | 1/2015 | Elmieh et al. | |
| 2015/0256633 A1* | 9/2015 | Chand | G06K 9/00536 382/103 |
| 2015/0378520 A1* | 12/2015 | Chandrasekaran | G06F 3/0482 715/716 |

OTHER PUBLICATIONS

"International Search Report and Written Opinion", Application No. PCT/US2015/041339, dated Oct. 30, 2015, 13 pages.
"SightLine: The Chair—Virtual Surreality", Retrieved from: http://sightlinevr.com/index.html on Nov. 30, 2015, 2 pages.
"Final Office Action", U.S. Appl. No. 14/513,761, dated May 3, 2017, 13 pages.
"Notice of Allowance", U.S. Appl. No. 14/335,833, dated May 24, 2017, 8 pages.
"Notice of Allowance", U.S. Appl. No. 14/333,387, dated May 4, 2017, 9 pages.
"Corrected Notice of Allowance", U.S. Appl. No. 14/335,821, dated Jan. 12, 2017, 2 pages.
"Final Office Action", U.S. Appl. No. 14/333,387, dated Feb. 27, 2017, 16 pages.
"First Action Interview Office Action", U.S. Appl. No. 14/335,833, dated Mar. 6, 2017, 3 pages.
"Foreign Office Action", EP Application No. 14752459.9, dated Mar. 6, 2017, 8 pages.
"International Preliminary Report on Patentability", Application No. PCT/US2015/041339, dated Feb. 2, 2017, 10 pages.
"Notice of Allowance", U.S. Appl. No. 14/513,761, dated Aug. 28, 2017, 5 pages.
"Foreign Office Action", EP Application No. 14805391.1, dated Dec. 19, 2017, 6 pages.
"Foreign Office Action", EP Application No. 14752459.9, dated Apr. 25, 2018, 6 pages.
"Non-Final Office Action", U.S. Appl. No. 15/449,931, dated Dec. 18, 2017, 12 pages.
"Notice of Allowance", U.S. Appl. No. 15/449,931, dated May 3, 2018, 5 pages.
"Foreign Office Action", European Application No. 14747480.3, dated May 22, 2018, 5 pages.
"International Search Report and Written Opinion", Application No. PCT/US2014/046907, dated Nov. 6, 2014, 11 Pages.
"International Search Report and Written Opinion", Application No. PCT/US2014/047302, dated Jan. 22, 2015, 13 Pages.
"International Search Report and Written Opinion", Application No. PCT/US2014/047269, dated Nov. 10, 2014, 13 pages.
Heymann,"Representation, Coding And Interactive Rendering Of High-Resolution Panoramic Images And Video Using MPEG-4", Panoramic Photogrammetry Workshop, Berlin, Germany, Feb. 28, 2005, 5 Pages.
Kwiatek,"360 degree Interactive Storytelling", University of Glasgow Retrieved from the Internet: URL:http://www.kwiatek.krakow.pl/publications/28128927_360storytelling_University_of_Glasgow_Karol_Kwiatek_PDF.pdf, Sep. 27, 2012, 80 Pages.
"International Preliminary Report on Patentability", Application No. PCT/US2014/046907, dated Jan. 19, 2016, 8 pages.
"International Preliminary Report on Patentability", Application No. PCT/US2014/047302, dated Jan. 19, 2016, 8 pages.
"International Preliminary Report on Patentability", Application No. PCT/US2014/047269, dated Jan. 19, 2016, 9 pages.
"Non-Final Office Action", U.S. Appl. No. 14/335,821, dated Feb. 25, 2016, 9 pages.
"Restriction Requirement", U.S. Appl. No. 14/335,821, Nov. 4, 2015, 5 pages.
"Non-Final Office Action", U.S. Appl. No. 14/513,761, dated Oct. 4, 2016, 12 pages.

(56) References Cited

OTHER PUBLICATIONS

"Notice of Allowance", Application No. 14/35,821, dated Oct. 25, 2016, 5 pages.
"Pre-Interview Communication", U.S. Appl. No. 14/335,833, dated Dec. 29, 2016, 3 pages.
"Foreign Office Action", European Application No. 14747480.3, dated Jan. 25, 2019, 10 pages.

* cited by examiner

VIEW-SELECTION FEEDBACK FOR A VISUAL EXPERIENCE

PRIORITY APPLICATION

This application claims priority under 35 U.S.C. Section 119(e) as a non-provisional application of U.S. Provisional Application No. 62/040,337, filed Aug. 21, 2014, and titled "View-Selection Feedback for a Visual Experience", the disclosure of which is hereby incorporated by reference in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Storytelling comes in many forms, including novels, short stories, audio books, movies, television programs, and live theater. With the exception of live theater, feedback is rarely used to improve a story after it is presented. Further, feedback for one story is often unreliable or even useless for deciding how best to create a new, different story. Writers and other story creators so often fail to create an engaging and popular story even with feedback from countless previous stories. This is due in part to the feedback often being binary—some number of persons may have loved *War and Peace* by Leo Tolstoy but which part and why? Analyzing a novel of such length, depth, and diversity of characters and scenes is not only daunting but knowing which portions made the story so great are difficult to assess. The same is true of visual storytelling—what makes The Godfather® one of the greatest movies of all time? Many excellent writers have tried to figure that out and created other movies attempting to garner that same popularity. They very rarely succeed.

BRIEF DESCRIPTION OF THE DRAWINGS

Techniques and apparatuses for view-selection feedback for a visual experience are described with reference to the following drawings. The same numbers are used throughout the drawings to reference like features and components.

DETAILED DESCRIPTION

Overview

Figure 1:
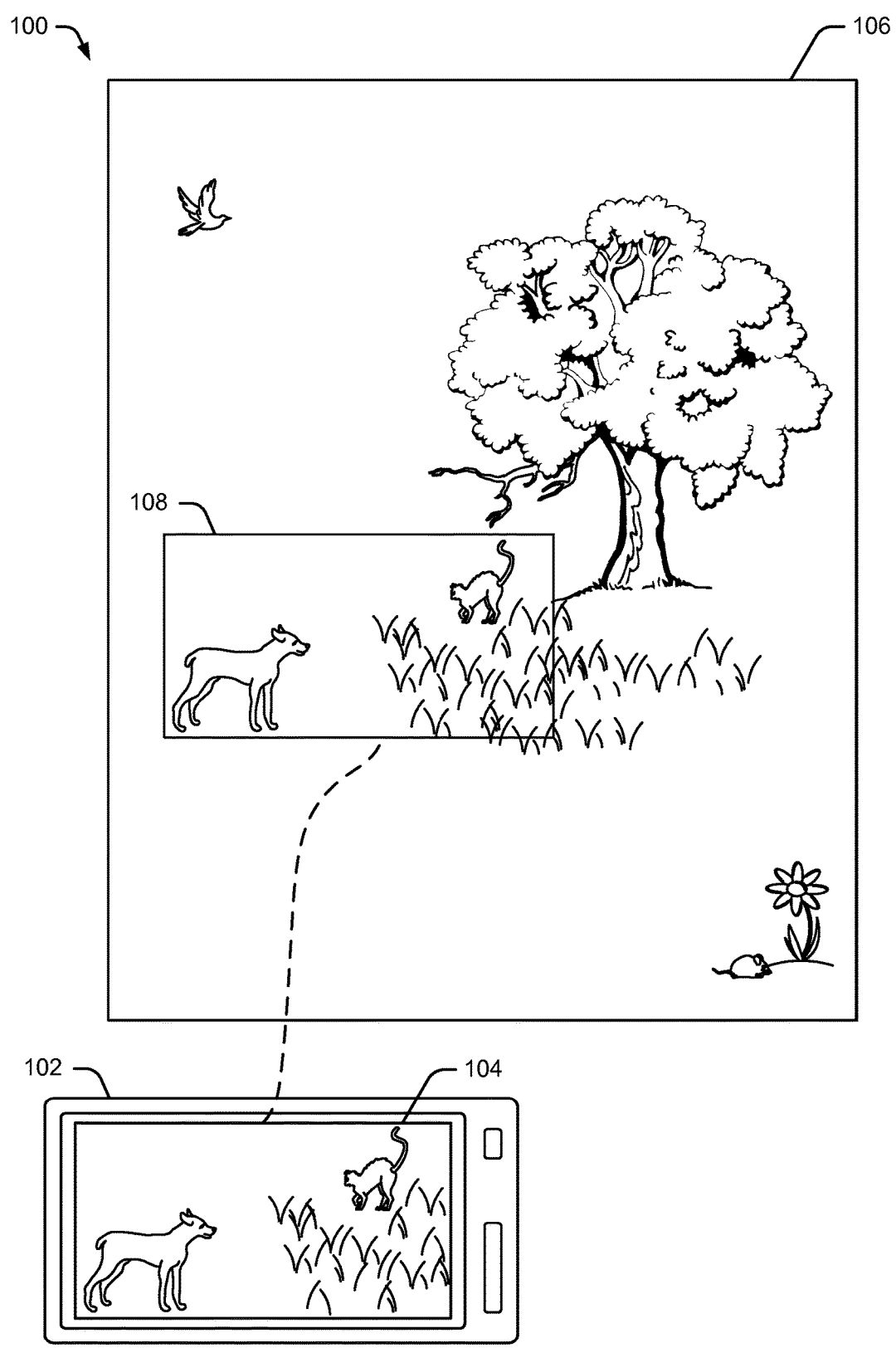
FIG. 1 illustrates an example environment in which techniques for view-selection feedback for a visual experience can be implemented.

This document describes techniques and apparatuses of view-selection feedback for a visual experience. These techniques and apparatuses enable writers, directors, and other story creators to create or alter visual experiences based on feedback provided by view selections made during visual experiences. This feedback can be analyzed to determine portions of a visual experience that users focused on through their view selections, wanted to see more of, were not interested in, found difficult to understand, and so forth. With this feedback, visual experiences, such as live-action movies and animated shorts, can be created or improved. Before detailing ways in which view-selection feedback can be used, this discussion turns to an illustration, which is helpful in understanding the wealth of information that view selections can provide.

Assume, for example, that a user wishes to watch the movie Ratatouille® about a rat that becomes a chef in Paris, France. The techniques described herein can present the movie such that the movie is not fully shrunken to fit on the user's mobile-device display. Thus, some portion of the movie is shown on the mobile-device display while some other portions of the movie are not. The techniques also enable these other portions of the movie to be viewed responsive to a user's selection. This enables the user to enjoy the story in more detail than if the movie were fully shrunken as well as enable to user to select the story's context by altering the portion of the movie being viewed. In other words, these techniques present the movie as a visual experience through which a user's mobile-device display is a view into that visual experience. The user may select to watch, in detail, the events central to the story, and deviate from those events to view the surrounding context.

Assume that the rat in the movie, named Remy, is floating rapidly down a sewer pipe. With the techniques, the user can view Remy by orienting his or her display to see Remy in detail. The user can also, however, tilt the display up to see the ceiling of the sewer pipe, left to view the pipe that Remy has already floated down, right to view the pipe toward which Remy is heading, and so forth, all using the described techniques. Further, when the user deviates from the events central to the story—here Remy traveling down the pipe—to look at trash in the sewer water or grime on the pipe's ceiling, the techniques may pause or delay the events central to the story so that the story still can be fully told to the user. The user may look away, focus on the trash and so forth, and when the user moves the display to see Remy once again, the story continues. By so doing, a user can enjoy the story as the author intended and with context, all through a mobile-device screen.

With one example of view selections illustrated, consider view-selection feedback in the context of an animated short is being viewed on a particular user's tablet computer. The animated short is not fully shrunken down to fit on the tablet's screen, but instead the user sees a portion of the available program and can select, by orienting the tablet's screen, to see various views. Thus, the user is not a passive viewer, but instead selects what portions to view. Assume that the animated short's storyline is concerned with a dog and cat, but that context is also provided. Through these view selections, assume that the user focuses on a contextual element—a mouse that is not part of the storyline. This view selection of the mouse can be received and, based on the view selection, the animated short can be altered, even in real-time and prior to the user finishing the animated short. Thus, on selection of the mouse, the techniques may provide a substory or additional detail about the mouse, thereby improving the animated short based on the person's interest.

By way of another example, assume that a live-action comedy program (e.g., a sitcom) is viewed on a smartphone where a user is able to select to view various portions of the program. Through view selections, the user is able to focus on a particular person in the comedy (one of three 20-something people on a couch in a coffee shop) or contextual elements in the comedy, such as a barista in the background. If many people follow the barista in the background through their selection to view the barista, the creator of the comedy may evaluate increasing the role of the barista in future episodes of the comedy or even altering later portions of that episode to show more of the barista.

Continuing this example, assume that view selections indicate that users tend to orient their view of the three 20-something people of the couch such that one of the three people is often at an edge or out of the user's view. The writers of this comedy may have thought that the person that is often out of view was central to the comedy but, based on these view selections, determine that the person's role or the person's dialog should be changed in future episodes.

These examples are just some of the many ways in which the techniques enable view-selection feedback for a visual experience. The following discussion turns to an operating environment, techniques that may be employed in the operating environment, and a device in which component(s) of the operating environment can be embodied. In the discussion below, reference is made to the operating environment by way of example only.

Example Environment

FIG. 1 illustrates an example environment 100 that is operable to employ techniques described herein. Environment 100 includes a mobile media-consumption device 102 (mobile device 102) having a display 104 on which portions of visual experience 106 are presented.

Visual experience 106 is capable of telling a story and providing context for that story, though some context within visual experience 106 can be unrelated to the story. Each story is an authored series of events previously written by a storyteller (e.g., a human writer) and presentable in a moving visual form, such as a theatrical production of Leo Tolstoy's novel *War and Peace*, Orson Welles's film Citizen Kane®, and the computer-animated movie Toy Story® by John Lasseter, Pete Docter, Andrew Stanton, and Joe Ranft.

Presentation of portions of visual experience 106 on display 104 depend on view selections made by a user of mobile device 102. Thus, mobile device 102 is capable of receiving view selections and, in response to these view selections, presenting views of visual experience 106 on display 104. View 108 is one example view showing a portion of visual experience 106, here a dog staring at a cat, which is central to the story being told.

Because view 108 shows characters central to the story, the techniques progress through the authored series of events making up the story. When the view selected is contextual, mobile device 102 may cease to tell the story. Thus, when a user selects to view various contextual elements, such as a bird, a flower, or a mouse, the story may cease to progress. When the user again selects to view the dog and cat, the techniques continue the story. By so doing, a story can be told in sufficient detail while still permitting a user to view context for that story.

Figure 2:
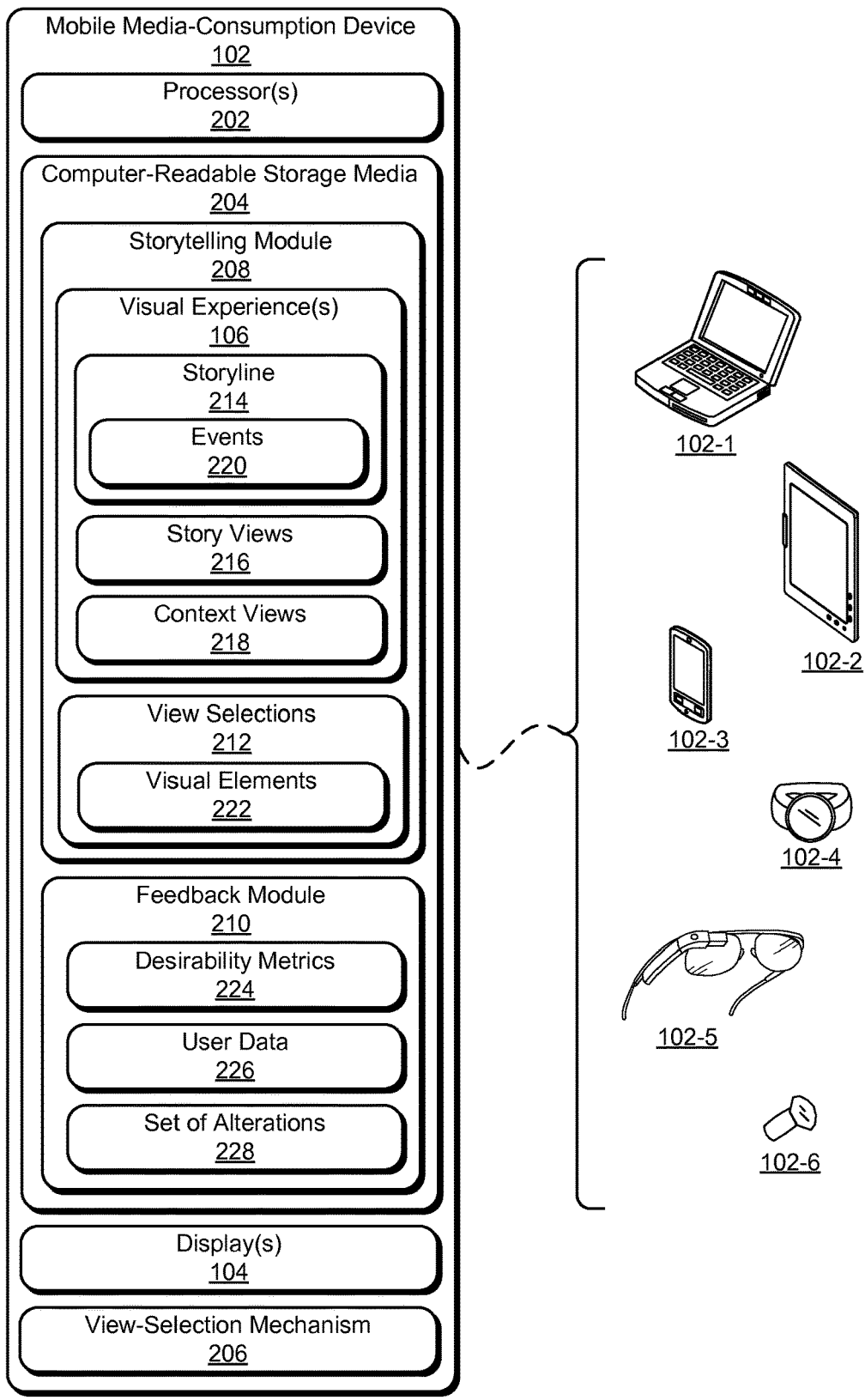
FIG. 2 illustrates an example embodiment of the mobile media-consumption device of FIG. 1.

More specifically, consider FIG. 2, which illustrates an example embodiment of mobile device 102 of FIG. 1. Mobile device 102 is illustrated with six example devices: a laptop computer 102-1, a tablet computer 102-2, a smart phone 102-3, a media-consumption watch 102-4, media-consumption eyewear 102-5, and a media-consumption ring 102-6, though other media-consumption devices and systems, such as a personal media player, a digital camera, and a personal navigation device are contemplated.

Mobile device 102 includes or has access to computer processor(s) 202, computer-readable storage media 204 (media 204), one or more displays 104, and view-selection mechanism 206. Media 204 includes a storytelling module 208 and a feedback module 210. Although not shown, media 204 may also include an operating system, applications, and user media and information, such as digital images, audio files, and documents.

View-selection mechanism 206 is capable of sensing a user's view selections through various input manners and devices, which range from buttons, capacitive sensors, and touch screens to orientation sensors capable of determining an orientation or orientation change of mobile device 102. Orientation sensors can determine selections that tilt, turn, move in, move out, move up, move left, move right, and move down display 104, to name just a few.

Storytelling module 208 includes or has access to one or more visual experiences 106 and view selections 212. Visual experiences 106 may include a storyline 214, story views 216, and context views 218. Storytelling module 208 is capable of presenting visual experience 106, receiving view selections 212, and progressing or ceasing to progress a story based on whether or not the view selections show the story, in whole or part.

Storyline 214 includes an authored series of events 220 that, when presented in the authored series, tell a story. Events 220 can be authored by one or many human authors, alone or with computer assistance. Further, events 220 can be of a fixed order and/or number, though each may vary in an amount of time to present each event. A fast-moving music video, for example, may present new scenes and actions in less than one second. A three-hour drama, however, may have few scene changes and long stretches of dialog, which can therefore include events that may be many minutes long (though events may be associated with particular dialog or action, and thus many events can be included in a single scene). Events can be part of respective sets of events making up scenes or acts, which an author may arrange such that the techniques, when returning to an incomplete event, repeat sets of events, though this is not required.

Figure 3:
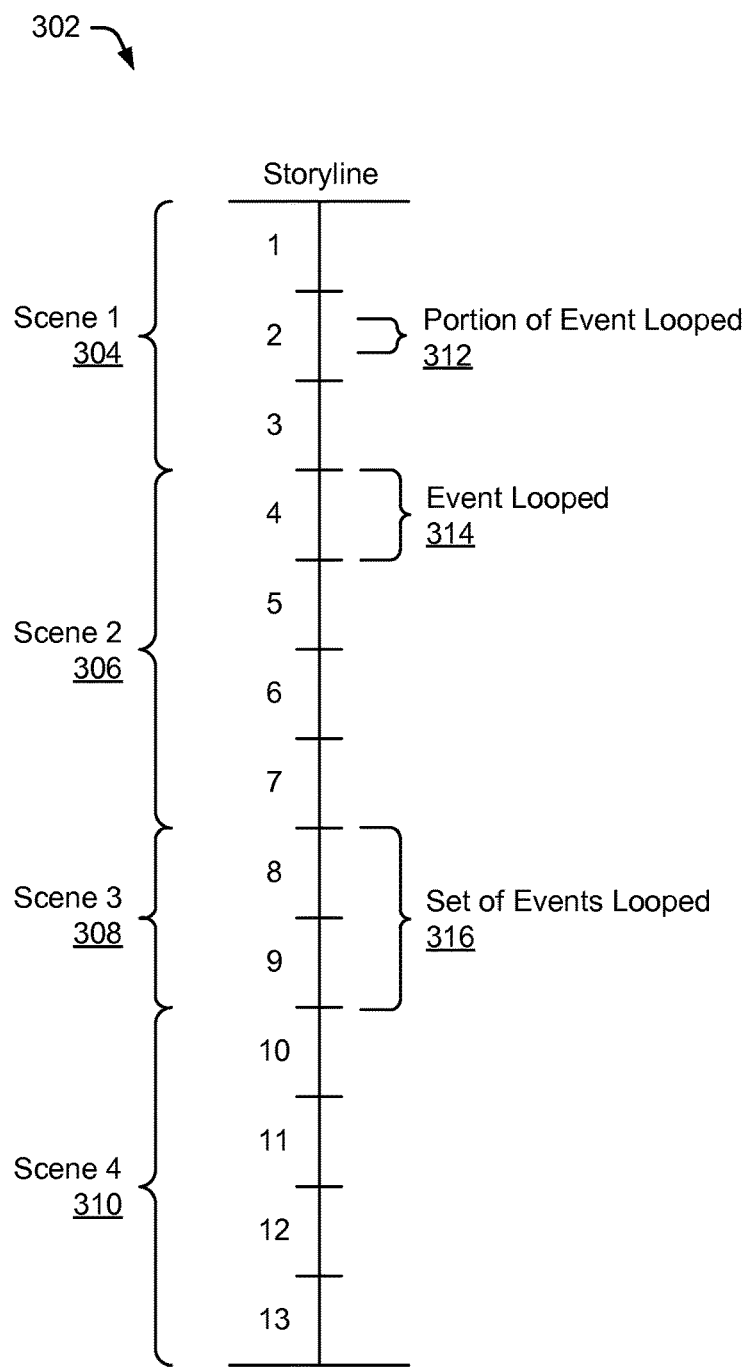
FIG. 3 illustrates a storyline for an animated short story in which a dog chases a cat around a park.

By way of example, consider FIG. 3, which illustrates a storyline 302 for an animated short story in which a dog chases a cat around a park. The short story has four scenes and 13 total events, first scene 304 includes events 1-3, second scene 306 includes events 4-7, third scene 308 includes events 8 and 9, and fourth scene 310 includes events 10-13. Assume that event 1 includes the dog sleeping restfully in the field and the cat slowly creeping through the grass near the dog. FIG. 1 illustrates the next event, event 2, in which the dog wakes up and stares at the cat and during which the cat arches her back and stares back at the dog. In event 3 the dog chases the cat and the cat runs up a tree. This example storyline 302 will be used as an aid in describing story views 216 and context views 218 below.

Story views 216 present at least a portion of one of events 220, which can be previously determined to enable a key element of the event to be seen or a substantial portion of the event to be seen. This previous determination is not required, as storytelling module 208, in some cases, can determine which views present events 220 of storyline 214. Whether predetermined or not, various manners can be used to determine whether a view is a story view or a context view.

Figure 4:
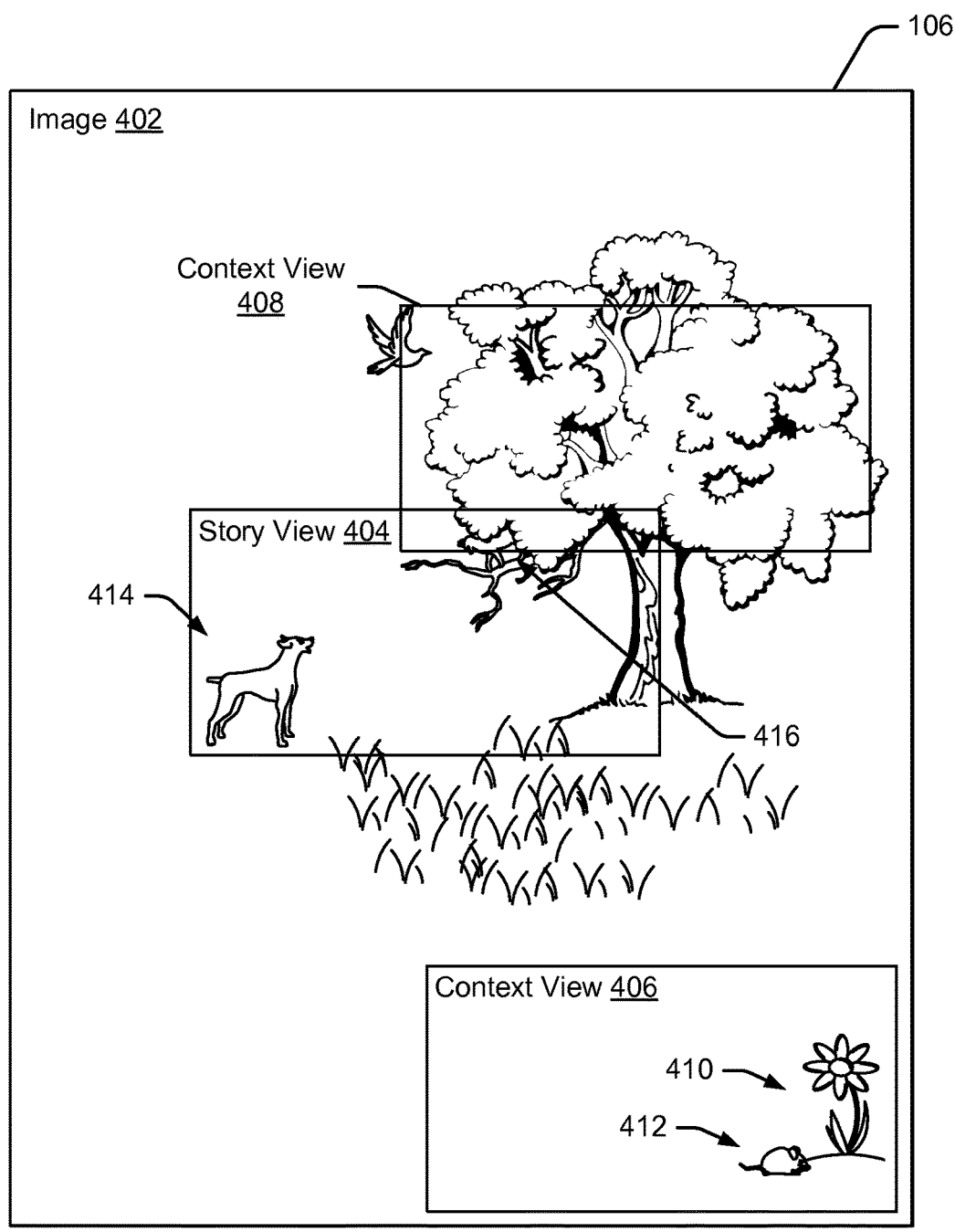
FIG. 4 illustrates an image of a visual experience for the storyline shown in FIG. 3.

By way of example, consider FIG. 4, which illustrates an image 402 of visual experience 106 for storyline 302 of FIG. 3. Image 402 includes a portion of event 4 of storyline 302 and includes a story view 404 and context views 406 and 408, which are examples of story views 216 and context views 218 of FIG. 2, respectively. Event 4 includes the dog barking at the cat with the cat up the tree. Thus, story view 404 includes the main characters of the story and is central to event 4. Context views 406 and 408 include no portion or an insufficient portion of event 4 of storyline 302. This is illustrated with context view 406 showing flower 410 and mouse 412, which includes no portion of event 4 by not showing any of dog 414 or cat 416. Context view 408 shows an insufficient portion of event 4 by showing part of cat 416 but none of dog 414.

Here assume that the author assigned conditions for determining whether a view is a story view or context view such that story views are those that include at least the dog's eyes and the cat's eyes but do not require both of their bodies to be within the view.

Various other manners can be used to assign or determined which views of visual experience 106 are story views 216 and which are context views 218, however. Examples include a threshold portion (e.g., 80%) of an ideal story view, a point on an image of the visual experience being within the view (e.g., all of the cat or dog but not both), a set of points or subset of the set (e.g., 4 of 4 points assigned to image 402) within the view, and so forth.

Returning to the example embodiment of mobile device 102 of FIG. 1, view selections 212 may include visual elements 222. Visual elements 222 may include context or non-context objects or persons, such as a contextual character (e.g., a waiter that is an extra to the plot), a non-contextual character (e.g., the main character), a table, chair, tree, and so forth. These visual elements 222 can be of use to feedback module 210 as noted below. View selections 212 may also include other entities of FIG. 2, such as events 220, story views 216, and context views 218 as described elsewhere herein.

Feedback module 210 is capable of receiving view selections 212 from one or many devices and for one or many visual experiences 106. With these view selections 212, feedback module 210 is capable of determining, during or after a presentation of visual experience for which view selections are received, an alteration to a current or future story view or context view of the visual experience. Feedback module 210 is also capable of determining, based on the view selections 212, desirability metrics 224 for one or more of the events shown in the view selections or for visual elements shown in the view selections. These desirability metrics 224 can be used to create a new visual experience or a new substory for an existing visual experience.

Feedback module 210 may also determine alterations and/or desirability metrics 224 based on user data 226. User data 226 may include one or more of: a location at which a presentation of a visual experience was made for which view selections are received (e.g., when a user watches a video at home, on the train, etc.); demographics of the user making the view selections (e.g., a culture, age, gender); a level of experience in use of prior visual experiences of the user making the selections (e.g., the person's first or $20^{th}$ visual experience with view selections); a device on which the view selections were made (e.g., a Moto X™); a screen size on which the presentation was made; ambient noise during presentation of the visual experience; ambient light during presentation of the visual experience; a geographical location or type of location at which the presentation of the visual experience was made; or a current activity of the user making the view selections (e.g., in a class, walking, at work, riding on a bus, etc.).

Feedback module 210 may select an alteration for a visual experience based on the view selections and from a set of alterations 228. This set of alterations can be previously created when the alteration is made in real-time or during a currently presented visual experience. In some cases, set of alterations 228 were previously created based on previously received view selections by other users of a prior-viewed visual experience. This prior-viewed visual experience can be identical to, or a prior version of, the currently presented visual experience or a different visual experience with similarities to the currently presented visual experience.

Feedback module 210 may determine desirability metrics 224 sufficient to assess a desirability of a context shown in context views 218 or associated with the visual elements of the events shown in story views 216 for a particular visual experience 106. Thus, desirability metrics 224 may indicate that, based on people selecting to view a girl much more often than a boy in a romantic comedy, future romantic comedies should focus on the girl.

Desirability metrics 224 can be general or tailored to particular persons based on demographics or other user data 226. Thus, on receipt of view selections from sufficient numbers of people, the metrics can indicate that a particular event or type of event (e.g., a joke) is especially desirable (e.g., funny) to people of a particular age or cultural background, for example.

Also, feedback module 210 can determine desirability metrics 224 that assess a desirability across many different visual experiences. To do so, similarities between events or visual elements of the various visual experiences can be determined and then correlated effective to create a correlated desirability metric measuring types of events or types of visual elements.

While shown as part of mobile device 102, feedback module 210 may operate remotely, in whole or in part, from mobile device 102. Consider, for example, FIG. 5, which illustrates remote device 502, network 504, and mobile device 102. Network 504 may be implemented, in whole or part, as a wired or wireless network in accordance with any suitable communication specification or standard. Remote device 502 includes one or more remote computer processors (remote processors) 506 and remote computer-readable storage media (remote CRM) 508. Remote CRM 508 includes feedback module 210, which in turn includes or has access to desirability metrics 224, user data 226, sets of alterations 228, and view selections 212. View selections 212 include events 220, visual elements 222, story views 216, and context views 218. As described below, feedback module 210 may receive view selections 212 from one or many persons and for one or many visual experiences 106. Thus, feedback module 210 may select from set of alterations 228 or build desirability metrics 224 based on a variety of view selections and visual experiences.

Methods

The following discussion describes techniques enabling view-selection feedback for a visual experience. These techniques can be implemented utilizing the previously described environment, such as display 104, view-selection mechanism 206, storytelling module 208, and/or feedback module 210 of FIGS. 1, 2, and 5. These techniques include example methods illustrated in FIGS. 6 and 8, which are shown as operations performed by one or more entities. The orders in which operations of these methods are shown and/or described are not intended to be construed as a limitation, and any number or combination of the described method operations can be combined in any order to implement a method, or an alternate method, including any of those illustrated by FIGS. 6 and 8.

Figure 6:
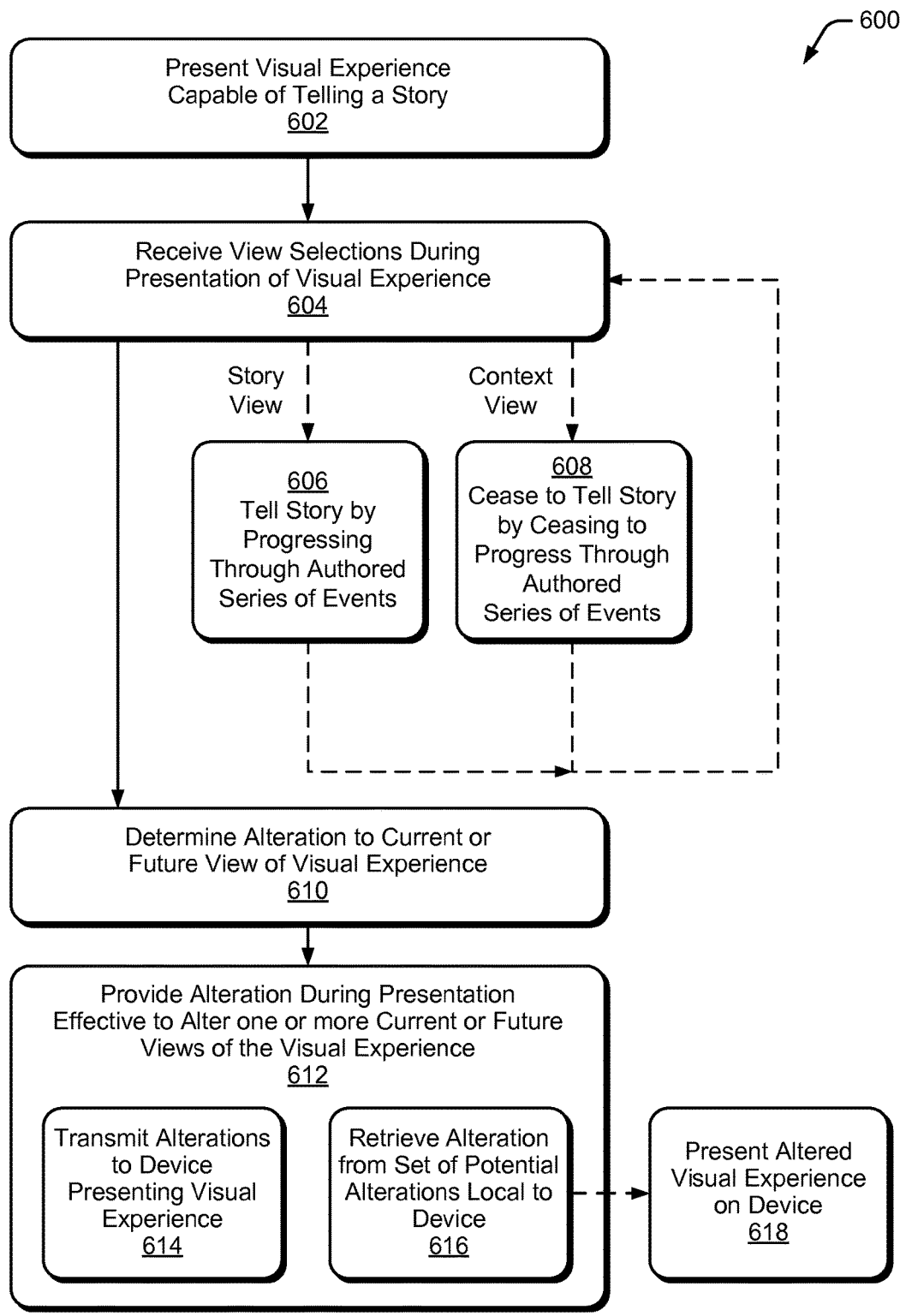
FIG. 6 illustrates example methods for view-selection feedback for a visual experience.

FIG. 6 illustrates example methods 600 enabling view-selection feedback for a visual experience. As part of methods 600, operations optional to view-selection feedback are shown to aid the reader.

At 602, a visual experience capable of telling a story is presented. As noted in part above, the story is an authored series of events and the visual experience may include story views and context views. The story views present at least a portion of an event of the authored series of events. The context views present context of the visual experience.

At 604, view selections are received. These view selections can be received at a remote device or a local device or both. Here some view selections are received locally and responded to immediately as part of telling the story on a device. Some view selections are used as feedback and received remotely or locally.

By way of example, assume view selections are received at a mobile media-consumption device on which the visual experience is presented. These view selections can alter or maintain a view into the visual experience from a prior view to a current view. Altering or maintaining the view can be effective to switch, in some cases, from a story view to a context view and vice-versa. Note that view selections, even if maintaining an orientation for the device, may still result in a change between a story view and a context view, as events of the story may move within the visual experience.

When the view selections result in story views, the techniques proceed along a Story View path to operation 606, where the story is told by progressing through the authored series of events. When the view selections result in context views, the techniques proceed along the Context View path to operation 608, progress through the authored series of events ceases, which also causes the telling of the story to cease. Methods 600 may repeat this operation, as shown at dashed lines from operation 606 to 604 and operation 608 to 604, as view selections may alternate from story view to context view and vice-versa until the story is fully told.

At 608, storytelling module 208 may cease to progress through the authored series of events by pausing an event of a last-presented story view. Alternately or additionally, storytelling module 208 may cease progress through the authored series of events by repeating the event, a set of events of which the event is a part, or a portion of the event. Examples of this repetition are illustrated in FIG. 3 with a portion of event looped 312, event looped 314, and set of events looped 316 (making up all of scene 308).

For example, storytelling module 208 may repeat the last-presented event, such as through repeating a seamless portion of an event, like repeating a loop of a half-second clip of the dog staring at the cat. This is illustrated in FIG. 3 with a portion of event looped 312. Then, when the user transitions from a context view back to the story view with the dog and cat, the story will progress in a visually seamless way. When the user left the dog and cat, the dog was staring at the cat and the cat was arching her back—the same is what the user sees when the user returns to the story. This is illustrated also in FIG. 4 as described above. When a user selects story view 404, storytelling module 208 progresses through the authored series of events concerning dog 414 and cat 416. Storytelling module 208 does not progress through the authored series of events when show context views 406 or 408.

View selections received at 604, however, may be used for feedback in addition to showing story views and context views. As noted in part above, the view selections may indicate context elements or non-context elements of special interest based on an amount of time, multiple view selections showing, or view selections heavily weighted to showing the context elements or non-context elements. Thus, view selections may indicate a preference for viewing the dog instead of the cat or some contextual element such as the tree, flower 410, or mouse 412 (all of FIG. 4). Note that view selections are not required to include story or context views, though these can be used to aid in pausing the story when not showing story views. Thus, alternatively or in addition, the view selections may indicate visual elements of interest to the user. Visual elements can include objects, persons, and so forth that a user views. If this view is very brief the techniques may note this and thus not show that element or similar future elements, especially if many persons view it only briefly. Consider, however, a case where the user's view selections indicate that a particular visual element that is not central to the story (a contextual element) is of interest.

Assume that view selections indicate that the user views and continues to view mouse 412 and flower 410. Feedback module 210 may determine that mouse 412 and flower 410 are interesting to the user. Based on this, feedback module 210 may determine to alter the visual experience to include more detail or even a new substory about mouse 412 and flower 410. As noted in part above, context views (or any view) may include a subordinate story that may also be an authored series of subordinate events.

At 610, an alteration to a current or future story view or context view of the visual experience is determined. This determination can be made after or during the presentation of the visual experience and based on the view selections, such as the many examples given above.

At 612 alterations are provided that are effective to alter the current or future story view or context view of the visual experience. As noted, feedback module 210 can provide these alterations for the same presentation of the visual experience. These alterations can be provided by transmitting (e.g., pushing) visual experience updates (e.g., new content or instructions to reduce or alter content) to the device on which the presentation is made (e.g., from feedback module 210 operating on remote device 502, through network 504, to mobile device 102 for presentation by storytelling module 208 operating on mobile device 102). Transmission of alterations to the device is shown at operation 614.

These alterations can also be determined and provided locally. Thus, feedback module 210 operating on mobile device 102, receives view selections during presentation.

From these view selections, feedback module determines the alteration from previously determined sets of alterations. Here, providing the alteration includes retrieving the alterations from local memory by drawing from the previously determined sets of alterations. Retrieving alterations from a set of potential alterations is shown at 616.

In either or alternate cases, following provision of alterations, the device presenting the visual experience can present the alteration of the visual experience on the device, shown at 618.

Figure 7:
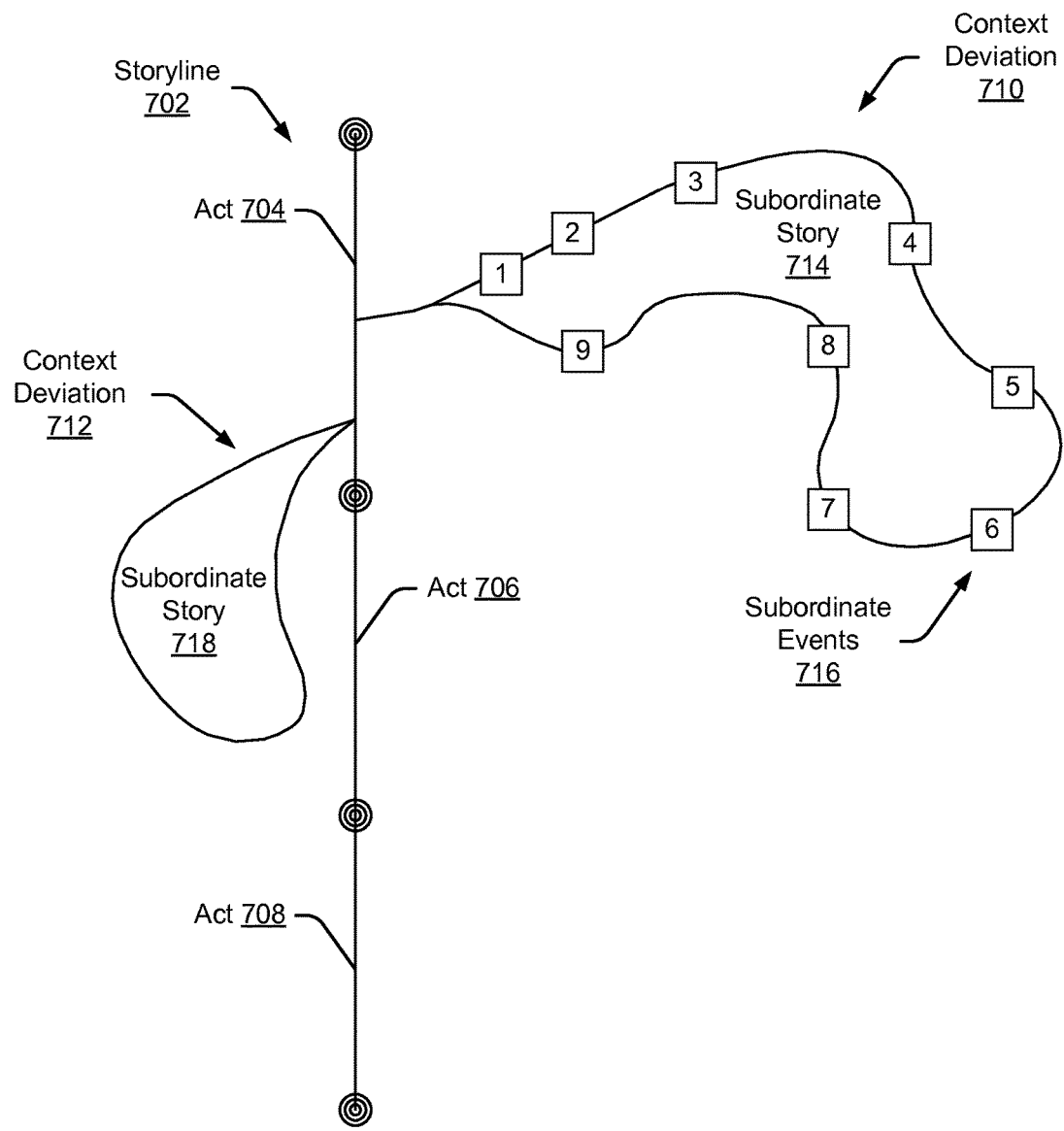
FIG. 7 illustrates a storyline, deviations into context from the storyline, and subordinate stories in accordance with one or more embodiments.

Consider again the dog-chases-cat story provided above. In that example, assume that a user selects to move from viewing dog 414 and cat 416 to view mouse 412 and flower 410, neither if which is related to, nor provides context about, dog 414 and cat 416. This is illustrated in FIG. 7, which shows a storyline 702 having three acts 704, 706, and 708 of various numbers of events (not shown). Two deviations into context from storyline 702 are shown, context deviations 710 and 712. Context deviation 710 includes subordinate story 714, with subordinate story 714's curving line illustrating an amount of time spent viewing the subordinate story, shown including nine subordinate stories 718. Here subordinate story 714 is an alteration to the dog-chases-cat visual experience, which is provided by feedback module 210. This subordinate story concerns mouse 412 and flower 410 and is provided responsive to view selections of these elements. The nine subordinate events 716 include: 1) the mouse eating a nut; 2) looking up at the flower; 3) seeing that the flower has sunflower seeds; 4) jumping onto the stalk of the flower; 5) the flower bending back under the weight of the mouse; 6) the flower snapping back; 7) the mouse flying off the stalk of the flower; 8) the mouse landing on the grass; and 9) the mouse brushing himself off.

By way of another example, assume that a user selects to view only cat 416 of FIG. 4. Responsive to the view selections staying on the cat (here the story would not progress unless the dog is also shown), feedback module 210 provides an alteration to the visual experience—here not to context elements themselves, but an embellishment providing context for a character central to the plot. By focusing on the cat with view selections, a subordinate story 718 is provided showing the cat sitting on the branch, scratching her ears, licking her paws, and tauntingly ignoring the dog. While subordinate story 718 provides character development and perhaps some understanding of why the dog is chasing the cat, the author can establish that this character development is or is not an event of the story, and thus is or is not needed for the story to progress.

In some cases, alterations can address a problem indicated by the view selections. Assume that view-selection feedback indicates that a user repeatedly views an event, possibly indicating that some part of the event is difficult to understand or is of some special interest. In such a case, feedback module 210 may determine to clarify or provide more information about the event, such as to make audio of the event clearer (e.g., louder or slower) or to provide captions on the screen to show the dialog in textual form. Expansion of the event make include additional visual elements, such as for an action event where much of the action moves quickly—thus to slow down the event, show more detail of the event, provide side details for the event (e.g., labels of objects on screen) and so forth.

Note that determination of alterations and providing alterations can be, but is not required to be, performed in real time sufficient to alter the visual experience even for view selections received at prior points of a same instance of a presentation of that visual experience. Also, the above methods 600 can be used for creating or altering visual experiences, whether for view selections received from one or many persons and in real time or otherwise.

Figure 8:
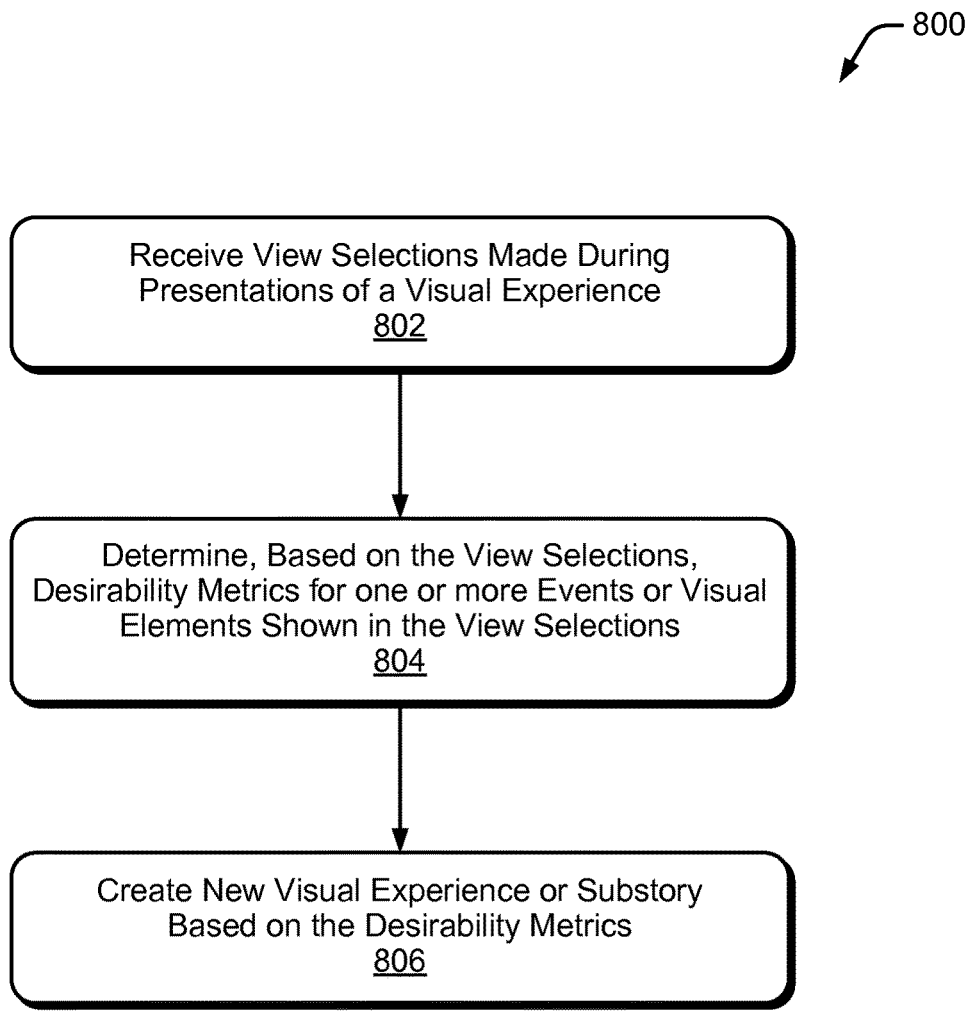
FIG. 8 illustrates example methods for view-selection feedback for a visual experience, including to create a new visual experience.

FIG. 8 illustrates example methods 800 enabling view-selection feedback for a visual experience, including to enable creation of new visual experiences.

At 802, view selections made during presentations of a visual experience are received. These view selections can be received from multiple devices on which the visual experience or other visual experiences are or were presented. These view selections can include events or visual elements and indicate what is or is not desirable.

Figure 9:
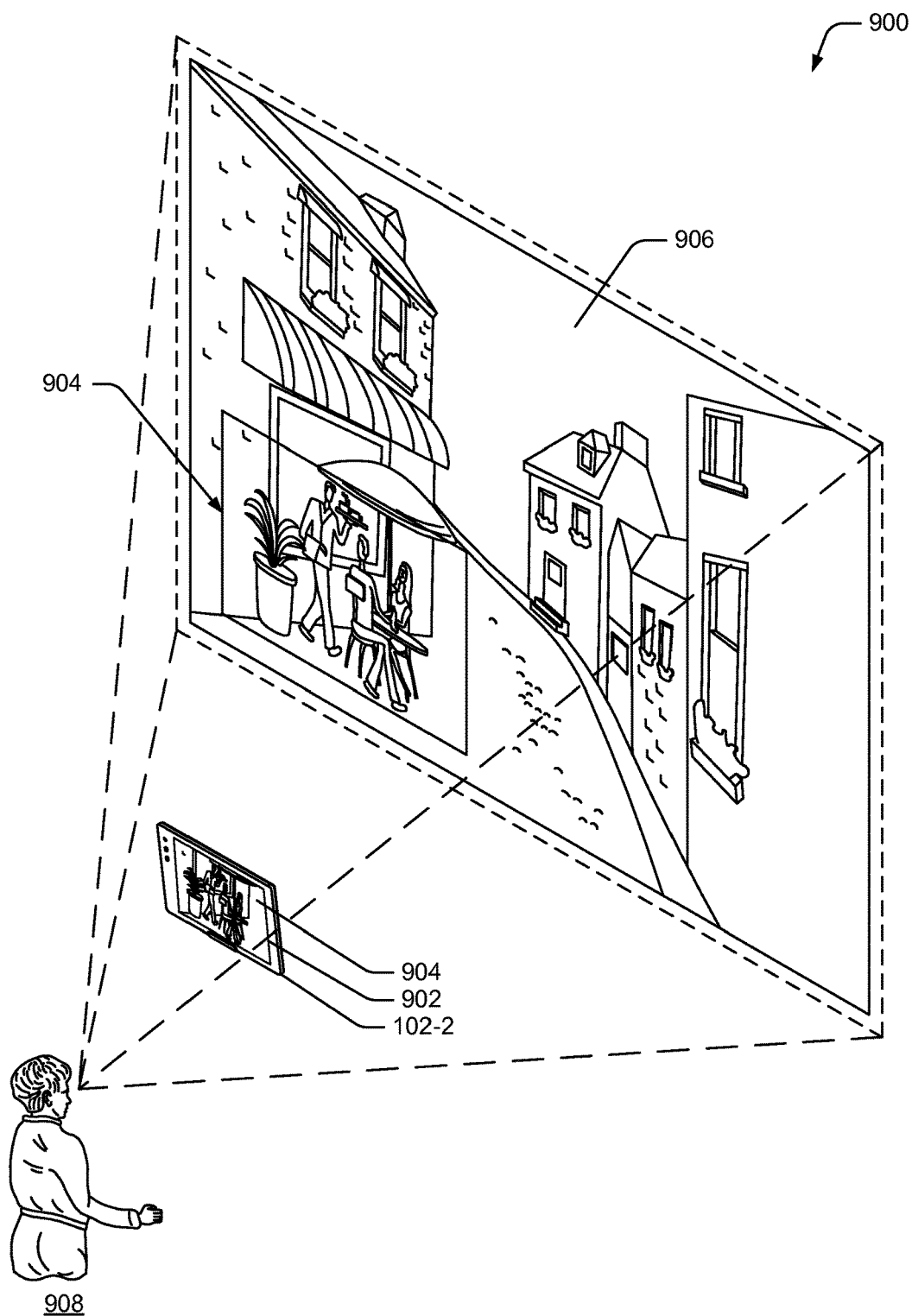
FIG. 9 illustrates an example setting having a tablet computer with a display in which a view selection shows a portion of movie.
Figure 10:
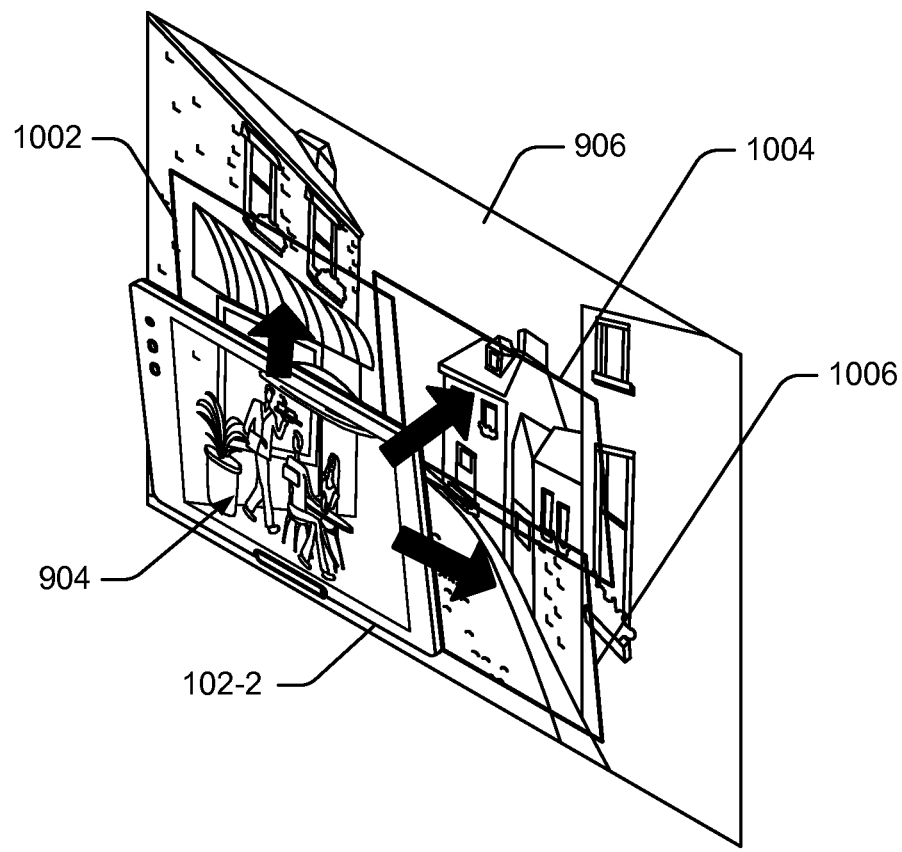
FIG. 10 illustrates various potential view selections that a viewer of FIG. 9 can make to view portions of the movie of FIG. 9.
Figure 11:
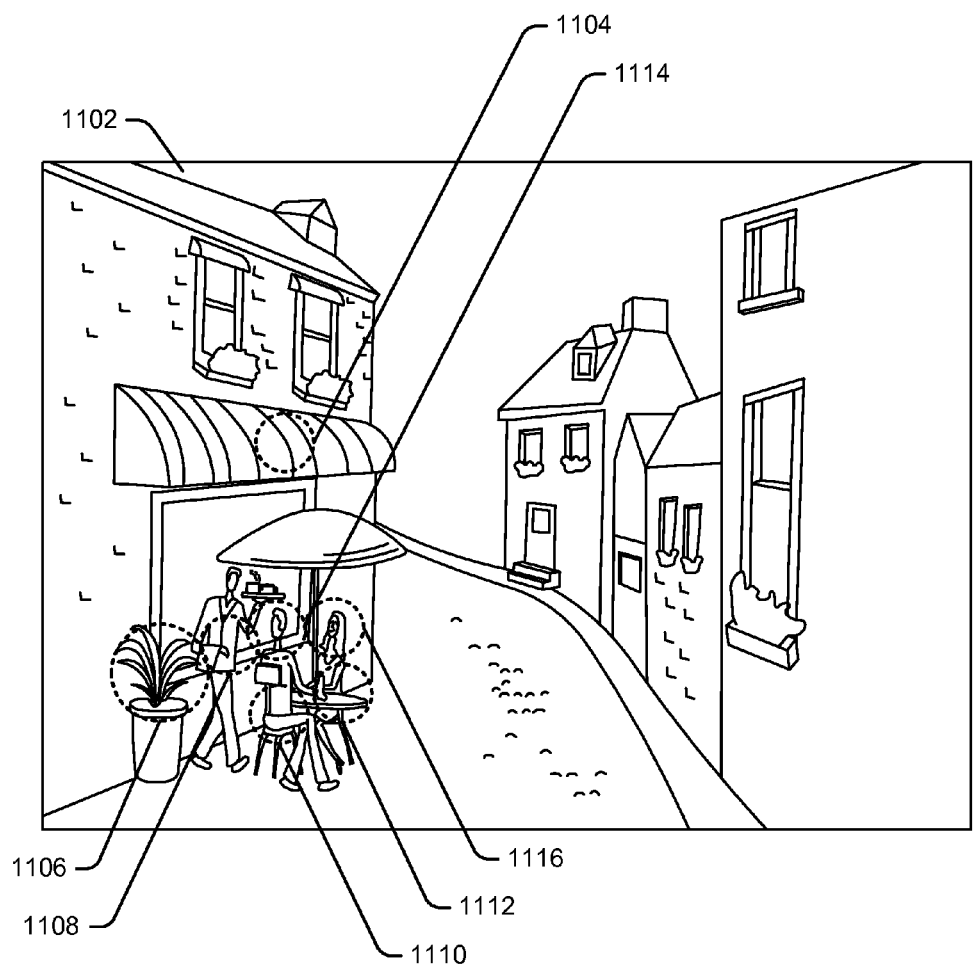
FIG. 11 illustrates a scene of the movie shown in FIGS. 9 and 10 along with various visual elements.

While some examples herein are concerned with animated visual experiences, this is not required. Consider, for example, a case where the visual experience is a live-action motion picture, the story is a plot, events of the story are portions or scenes showing parts of the plot, and visual elements are objects shown in the live-action motion picture. This is illustrated in FIGS. 9, 10, and 11. FIG. 9 illustrates an example setting 900 having tablet computer 102-2 with a display 902 in which a view selection 904 shows a portion of movie 906. Viewer 908 selects views, such as view selection 904.

FIG. 10 further illustrates this example, showing various potential view selections that viewer 908 (shown in FIG. 9) can make, including view selection 904 and potential view selections 1002, 1004, and 1006 through tablet computer 102-2 for portions of movie 906.

Through these various view selections made over the course of the movie, feedback as to various users' preferences are indicated. To further illustrate this example, consider FIG. 11, which shows a scene 1102 showing a couple sitting at a table in an outdoor café. Storytelling module 208 enables viewer 908 of FIG. 9 to select views, which can include story views, context views, and visual elements. Consider the following visual elements of FIG. 11: awning 1104, plant 1106, waiter 1108, sitting man 1110, sitting woman 1112, sitting man's face 1114, and sitting woman's face 1116. Through selection of views, these visual elements are also selected, and as selected, can be analyzed, as noted herein.

At 804, desirability metrics for one or more of the events shown in the view selections or visual elements shown in the view selections are determined. Desirability metrics are usable to create a new visual experience or a new substory for an existing visual experience.

Desirability metrics (see 224 of FIGS. 2 and 5) can be determined by feedback module 210 from view selections or visual elements therein from many persons for the visual experience or different visual experiences. Further, feedback module 210 may present these in formats usable by authors, writers, and so forth. In one example case desirability metrics 224 are presented as a histogram or statistical overview for each visual element or event for a visual experience. Through this, portions of the visual experience to which some number of persons has positive, ambivalent, or negative interest can be assessed.

In some cases view selections are received with various other information noted above, such as demographics or an indication that a user ceased to watch the visual experience (e.g., loss of user eye contact with the screen) at some point prior to an intended end of the story in the visual experience. This is one piece of information that can be used to determine that view selections made prior to user ceasing to watch indicate that a negative or ambivalent interest is appropriate.

Returning to methods 800, at 806 a new visual experience or substory is created based on the determined desirability metrics. This can be performed, in some cases, through the techniques, such as by selecting from a set of alterations (e.g., 228 of FIGS. 2 and 5). In others a person is directly involved and using the desirability metrics, in which case the techniques enable the writer to better-understand how to create or improve visual experiences.

Concluding the example illustration of FIGS. 9, 10, and 11, assume that view selections are received for a demographic group of women aged 18-24 that heavily favors views showing the sitting woman's face 1116 rather than the sitting man's face 1114 or other visual elements. Based on desirability metrics 224 indicating this, a writer may create a new visual experience, such as a sequel to this movie or a stand-alone movie that focuses more on the female lead for movies directed to a target audience having women aged 18-24.

Example Device

Figure 12:
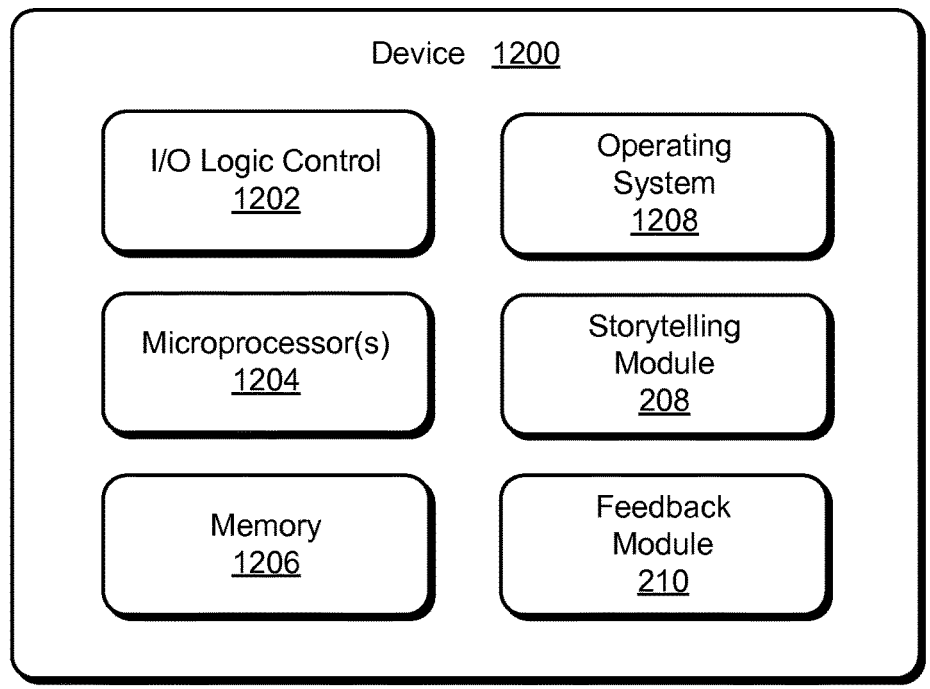
FIG. 12 illustrates a device having various components capable of implementing techniques of view-selection feedback for a visual experience.

FIG. 12 illustrates various components of an example device 1200 including storytelling module 208 and feedback module 210. These components may include or have access to other modules described herein, and may be implemented in hardware, firmware, and/or software and as described with reference to any of the previous FIGS. 1-11.

Example device 1200 can be implemented in a fixed or mobile device being one or a combination of a media device, computing device (e.g., mobile device 102 of FIG. 1 or remote device 502 of FIG. 5), video processing and/or rendering device, appliance device (e.g., a closed-and-sealed computing resource, such as some digital video recorders or global-positioning-satellite devices), gaming device, electronic device, vehicle, and/or workstation, so long as each is associated with a mobile display or a display that cannot show all of a visual experience at once without sacrificing context or detail.

Example device 1200 can be integrated with electronic circuitry, a microprocessor, memory, input-output (I/O) logic control, communication interfaces and components, other hardware, firmware, and/or software needed to run an entire device. Example device 1200 can also include an integrated data bus (not shown) that couples the various components of the computing device for data communication between the components.

Example device 1200 includes various components such as an input-output (I/O) logic control 1202 (e.g., to include electronic circuitry) and microprocessor(s) 1204 (e.g., application processor, microcontroller, or digital signal processor). Example device 1200 also includes a memory 1206, which can be any type of random access memory (RAM), a low-latency nonvolatile memory (e.g., flash memory), read only memory (ROM), and/or other suitable electronic data storage.

Example device 1200 can also include various firmware and/or software, such as an operating system 1208, which can be computer-executable instructions maintained by memory 1206 and executed by microprocessor 1204. Example device 1200 can also include other various communication interfaces and components, wireless LAN (WLAN) or wireless PAN (WPAN) components, other hardware, firmware, and/or software.

Figure 5:
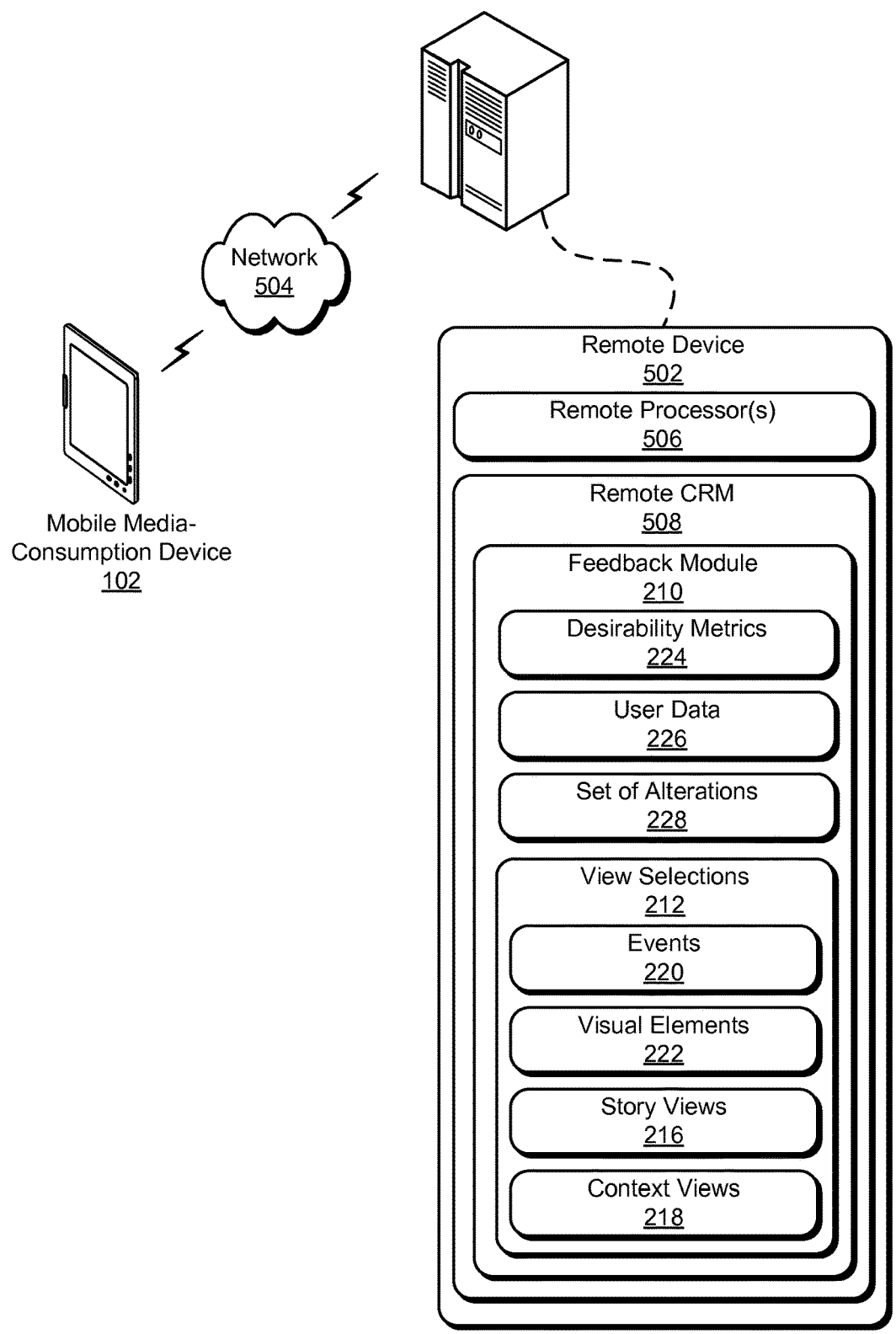
FIG. 5 illustrates a remote device capable of communication, through a network, with the mobile media-consumption device of FIG. 1.

Other examples capabilities and functions of these components are described with reference to elements shown in FIGS. 2 and 5, along with illustrations of FIGS. 1, 3, 4, and 6-11. These components, either independently or in combination with modules or entities described herein, can be implemented as computer-executable instructions maintained by memory 1206 and executed by microprocessor 1204 to implement various embodiments and/or features described herein. These components may also be provided integral with other components of device 1200, such as integrated with storytelling module 208 or feedback module 210.

Alternatively or additionally, any or all of these components can be implemented as hardware, firmware, fixed logic circuitry, or any combination thereof that is implemented in connection with the I/O logic control 1202 and/or other signal processing and control circuits of example device 1200. Furthermore, some of these components may act separate from device 1200, such as a remote (e.g., cloud-based) feedback module 210 performing services alone or in combination with components on mobile device 102.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
presenting a visual experience on a display of a mobile media-consumption device, the visual experience comprising:
   a live-action or computer-animated film; and
   a story having story views and context views, the story views presenting at least a portion of an event of an authored series of events, the context views presenting context of the visual experience, the context comprising additional detail about at least one of the story views or an element of the visual experience separate from the authored series of events;
receiving view selections during the presentation of the visual experience, the view selections non-passively made by a user during the presentation of the visual experience, the view selections received through one or more orientation sensors of the mobile media-consumption device, the view selections configured to view a part, but not all, of the visual experience, the part of the visual experience comprising at least a portion of one of the story views or a portion of one of the context views from among the story views and the context views of the story of the visual experience;
viewing, based on the received view selections, the part of the visual experience on the display;
determining, during the presentation of the part of the visual experience and based on the view selections, an alteration to a current or future story view or a current or future context view of the visual experience;
providing the alteration, during the presentation of the part of the visual experience, effective to alter the current or future story view or the current or future context view of the visual experience;
determining, based on the received view selections and the viewed part of the visual experience, one or more interest elements of the visual experience, the determined one or more interest elements of the visual experience corresponding to an interest level of the user;
aggregating the determined one or more interest elements of the visual experience into feedback;
transmitting the feedback of the visual experience;

receiving another visual experience, the other visual experience adjusted to correspond to the transmitted feedback; and presenting the other visual experience on the display of the mobile media-consumption device.

2. The computer-implemented method of claim 1, wherein the determining the alteration determines the alteration from a set of previously created alterations, the set of previously created alterations created based on previously received view selections by other users of a prior-viewed visual experience, the prior-viewed visual experience being identical to, or a prior version of, the visual experience.

3. The computer-implemented method of claim 1, wherein the view selections include selecting one or more of the context views and wherein the story ceases to progress through the authored series of events.

4. The computer-implemented method of claim 3, wherein the one or more context views include a subordinate story, the subordinate story being an authored series of subordinate events, and wherein the alteration to the current or future story view or the current or future context view alters the subordinate story to add portions to, or delete portions from, the subordinate story.

5. The computer-implemented method of claim 1, wherein the determining the alteration is further based on user data, the user data including: a location at which the presentation was made; an age of the user; a culture of the user; an experience in use of prior visual experiences of the user; a device on which the view selections are made; a screen size of the display; ambient noise during presentation of the visual experience; ambient light during presentation of the visual experience; a geographical location or type of location at which the presentation of the visual experience is made; or a current activity of the user.

6. The computer-implemented method of claim 1, wherein one or more of the view selections indicates a selection repeatedly viewing an event of the authored series of events and further comprising altering the event to present clearer audio during the event or to expand the event to include additional visual elements.

7. The computer-implemented method of claim 1, further comprising creating or altering a substory for the visual experience based on a set of view selections including the view selections and multiple other view selections from other users.

8. The computer-implemented method of claim 1, wherein the visual experience is the live-action film, the live-action film being a movie designed for presentation on a movie screen.

9. The computer-implemented method of claim 1, wherein the view selections to view on the display the part of the visual experience are received through an orientation or orientation change of the display.

10. The computer-implemented method of claim 9, wherein the orientation or orientation change are sensed through the orientation sensors, the orientation sensors capable of determining selections that tilt, turn, move in, move out, move up, move left, move right, and move down the mobile-device display.

11. The computer-implemented method of claim 1, wherein the view selection is a view into the visual experience, the view enabling the user to watch in detail the events of the authored series of events or to deviate from those events to view the context.

12. The computer-implemented method of claim 1, wherein the element of the visual experience separate from the authored series of events comprises a contextual character, a contextual object, a contextual person, a contextual animal, or a contextual plant.

13. The computer-implemented method of claim 1, wherein the view selections to view on the display the part of the visual experience are received through buttons, capacitive sensors, or touch screens.

14. The computer-implemented method of claim 1, wherein the part of the visual experience viewable on the display comprises a contiguous subportion of an entire viewable area of the visual experience.

15. The computer-implemented method of claim 1, wherein the interest level of the user comprises a higher level and wherein the higher interest level is determined by the user making the view selections that focus on the one or more interest elements.

16. The computer-implemented method of claim 1, wherein the interest level of the user comprises a lower level and wherein the lower interest level is determined by the user making the view selections that exclude the one or more interest elements from being presented on the display.

17. A mobile media-consumption device comprising:
a display;
orientation sensors;
one or more computer processors; and
one or more computer-readable storage devices comprising processor-executable instructions that, responsive to execution by the one or more computer processors, implement a storytelling module to perform operations including:
presenting, on the display, a live-action or computer-animated visual experience capable of telling a story through presentation of the visual experience, the story having story views and context views, the story views presenting at least a portion of an event of an authored series of events, the context views presenting context of the visual experience, the context comprising additional detail about at least one of the story views or an element of the visual experience separate from the authored series of events;
receiving, from the orientation sensors, view selections made non-passively during presentation of the visual experience, the view selections configured to view on the display a part, but not all, of the visual experience, the part of the visual experience comprising at least a portion of one of the story views or a portion of one of the context views from among the story views and the context views of the story of the visual experience;
responsive to a view selection to present the portion of the story view showing one of the events of the authored series of events, presenting on the display portions of the visual experience effective to tell the story by progressing through the authored series of events; or
responsive to a view selection to present the portion of the context view not showing one of the events of the authored series of events, causing the display to cease to progress through the authored series of events;
receiving, from the orientation sensors, an alteration to a current or future story view or a current or future context view of the visual experience, the alteration to the current or future story view or the current or future context view determined based on one or more of the view selections;

responsive to receiving the alteration from the orientation sensors, presenting the visual experience on the display with the alteration to the current or future story view or the current or future context view;

determining, based on the received view selections and the viewed part of the visual experience, one or more interest elements of the visual experience, the determined one or more interest elements of the visual experience corresponding to an interest level of the user;

aggregating the determined one or more interest elements of the visual experience into feedback;

transmitting the feedback of the visual experience;

receiving another visual experience, the other visual experience adjusted to correspond to the transmitted feedback; and presenting the other visual experience on the display of the mobile media-consumption device.

18. The mobile media-consumption device of claim 17, wherein the processor-executable instructions further implement a feedback module to perform operations including determining the alteration to the current or future story view or the current or future context view based on the one or more of the view selections received from the orientation sensors or to aggregate the interest elements into the feedback, and wherein the storytelling module receives the alteration from the feedback module.

19. The mobile media-consumption device of claim 17, wherein the view selections to view on the display the part of the visual experience are received through an orientation or orientation change of the mobile media-consumption device.

20. The mobile media-consumption device of claim 17, wherein the view selection is a view into the visual experience, the view enabling a user to watch in detail the event in the story view or to deviate from the story view to the context view.

* * * * *